Figure 1:
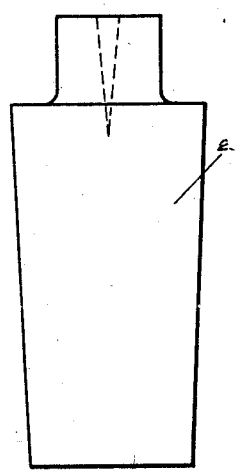

Feb. 8, 1938.   R. K. HOPKINS   2,107,943
METHOD OF MANUFACTURING COMPOSITE SEAMLESS TUBES
Filed June 5, 1936   2 Sheets-Sheet 1

INVENTOR
Robert K. Hopkins
BY Virgil F. Davis
ATTORNEY

Feb. 8, 1938.  R. K. HOPKINS  2,107,943

METHOD OF MANUFACTURING COMPOSITE SEAMLESS TUBES

Filed June 5, 1936   2 Sheets-Sheet 2

INVENTOR
Robert K. Hopkins
BY Virgil F. Davios
ATTORNEY

Patented Feb. 8, 1938

2,107,943

UNITED STATES PATENT OFFICE 2,107,943

METHOD OF MANUFACTURING COMPOSITE SEAMLESS TUBES

Robert K. Hopkins, New York, N. Y., assignor to The M. W. Kellogg Co., New York, N. Y., a corporation of Delaware Application June 5, 1936, Serial No. 83,664

9 Claims. (Cl. 29—188)

This invention relates to the manufacture of composite seamless metallic tubes and in particular to the manufacture of seamless tubes having an integral lining of special characteristics inseparably and continuously bonded to the main body of the tube.

In the processing arts, particularly the chemical and petroleum refinery arts, it is common practice to flow corrosive fluids through pipes, tubes, conduits etc., under conditions that usually accentuate the corrosive character of the fluids and shorten the safe life of the pipes, tubes, conduits, etc. Ordinary construction materials, such as carbon steel and the like, are not corrosion resistant to a sufficient degree for long safe life in this class of service although they are otherwise well suited as they have the necessary strength, they behave satisfactorily at elevated temperatures and are cheap. Since the commercial advent of chromium-irons, chromium-steels, chrome-nickel-iron alloys, etc., of high corrosion resistance properties the tendency has been to use them in making tubes for the class of service stated.

At present tubes made up entirely of the high corrosion resistant materials are available and have been used in numerous installations where, by reason of the severe conditions of the service, their superior resistance to corrosion warrants their use in spite of their extremely high cost. The results hoped for have not always been obtained because of the metallurgical characteristics of some of the high corrosion resistant materials. Such tubes have not been used as extensively as their superior properties would seem to warrant primarily because of their excessive cost. The excessive cost of the solid tubes of high corrosion resistant materials is due in part to the cost of the high corrosion resistant materials and in part to the high manufacturing cost.

Seamless tubes of high corrosion materials are at present manufactured much in the same way as seamless steel tubes, that is, the high corrosion resistant metal is cast into an ingot of suitable size which after being heated to the proper working temperature, is rolled into a billet bar; the billet bar is trimmed and cropped, and then sheared into billets of suitable length. The billets are heated to the proper working temperature and after being centered are pierced, as by rolling in a Mannesmann mill or by trepanning or otherwise. The pierced billets are then rolled in several steps to the desired tube size.

The cropping and trimming operations are always necessary and since in these operations a substantial percentage of the metal of the ingot is lost, or practically lost as it can only be disposed of as low priced scrap, these operations add materially to the cost of the finished tubes. The cost of the finished tubes is also materially increased due to the physical and metallurgical characteristics of the high corrosion resistant materials. The corrosion resistant materials cause a greater amount of wear and galling of the rolls, mandrels, guides, and other parts of the rolling apparatus with which they come in contact than does carbon steel. This excessive wear is due to the fact that the high corrosion resistant materials are generally harder and tougher than carbon steel and also that the scale formed on the high corrosion resistant materials is more refractory and more abrasive than that formed on carbon steel.

When plain carbon steel tubes are fabricated, it is the present practice to pass the billets to the train of mills at such a rate that each piece of apparatus is substantially continuously performing its part of the tube fabricating operation. This of course increases the efficiency of the plant and materially reduces the cost of the finished tubes. The continuous operation is sometimes interrupted due to wear or failure of the rolls, mandrels, etc. When such interruption occurs the material undergoing fabrication is usually discarded. Interruptions due to wear or failure are not frequent and while they are expensive the loss is more than offset by the savings due to the continuous operation.

When tubes of solid high corrosion resistant material are fabricated the operation cannot be carried on economically as a continuous operation. The reason for this is that the interruptions due to wear or failure of the rolls, mandrels, etc., are much more frequent than in the case of plain steel and the cost of the discarded material more than makes up for any saving resulting from the continuous operation. Careful study reveals that by far the greater part of the holdups caused by apparatus failures, when operating on the high corrosion resistant material, are due to contact with the outside surface of the material and only a small part of the holdups are due to contact with the inside surface. The holdups resulting from contact with the inside surface are generally of short duration and do not materially add to the cost of the operation as the parts of the apparatus, generally mandrels, that fail due to this cause are cheap and can be quickly replaced. The present accepted practice, when operating on the high corrosion resistant material, is to feed the billets to the mills at such a rate that a minimum of material, usually one billet, is being worked on at any one time.

It is an object of this invention to provide seamless composite metal tubes, and a method for fabricating them, which include a plurality of substantially concentric annuli integrally and continuously bonded to each other throughout their interfacial area, one of the annuli including the major portion of the cross sectional area and being made up of a comparatively inexpensive metallic material, the others of the annuli including the minor portion of the cross sectional area and being made up of a more expensive metallic material, or materials, that has a special property, or properties, not posssessed by the material of the major portion.

It is a further object of this invention to provide seamless composite metal tubes, and a method for making them, which includes an outer annulus of comparatively inexpensive material of sufficient strength for the service and an inner annulus of comparatively expensive material of high corrosion resistance, the annuli being integrally and continuously bonded to each other throughout their interfacial area.

It is a still further object of this invention to provide seamless composite metal tubes, and a method for making them, which include an inner annulus of comparatively inexpensive material of sufficient strength for the service and an outer annulus of comparatively expensive material of high corrosion resistance, the annuli being integrally and continuously bonded to each other throughout their interfacial area.

It is also an object of this invention to provide seamless steel tubes, and a method for making them, that includes a thin lining of chromium containing corrosion resistant alloy integrally and continuously bonded to the main steel portion of the tubes.

Figure 2:
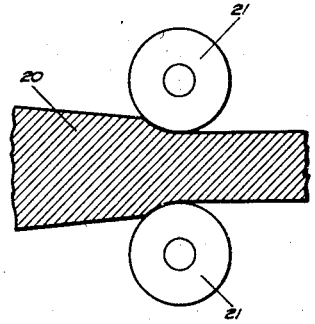
Figures 3, 5:
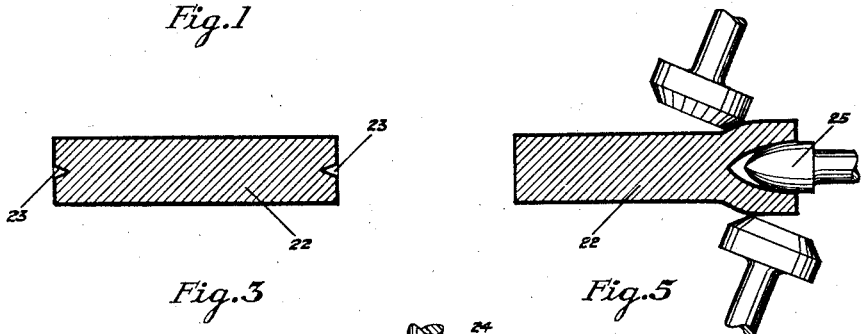
Figure 4:
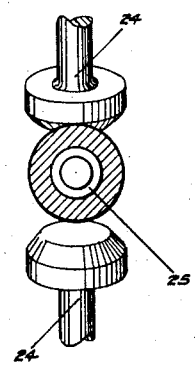
Figure 6:
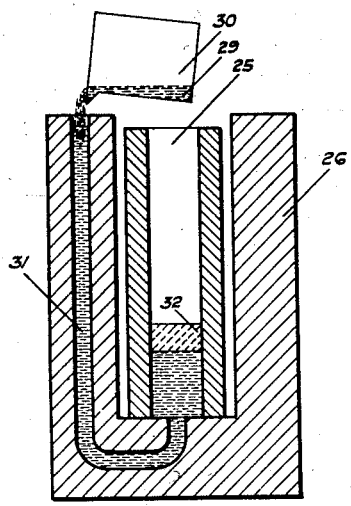
Figure 7:
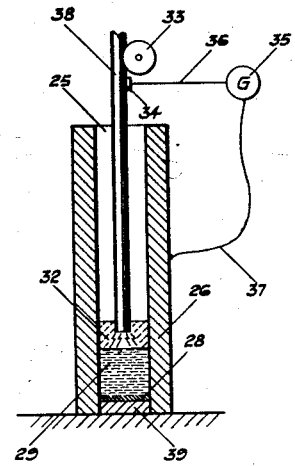
Figure 8:
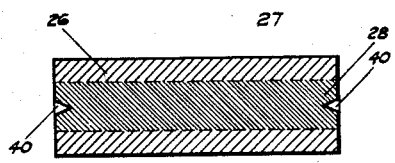
Figure 9:
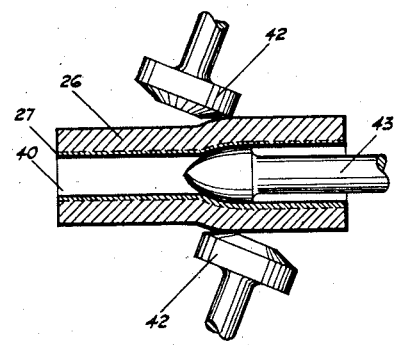
Figure 10:
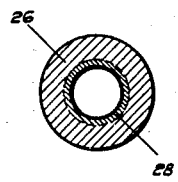
Figure 11:
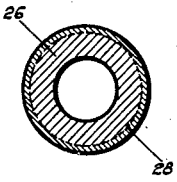
Figure 12:
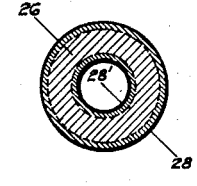

The further objects and advantages of the invention will be better understood from a consideration of the following description of embodiments of the invention and preferred modes of carrying out the invention in practice, taken with the accompanying drawings in which, Fig. 1 is a front elevation of a cast ingot, Fig. 2 is a sectional view of an ingot on its way through billet bar forming rolls, Fig. 3 is a sectional view of a centered billet, Figs. 4 and 5 are diagrammatic end and plan views respectively of a billet on its way through a Mannesmann mill, Figs. 6 and 7 are part sectional diagrammatic views illustrating two modes of filling the central core of an annulus, Fig. 8 is a sectional view of a centered composite billet, Fig. 9 is a sectional view of a composite tube on its way through reducing rolls, and, Figs. 10, 11, and 12 are sectional views of finished composite tubes, the tube of Fig. 10 having an internal protective annulus, the tube of Fig. 11 having an external protective annulus, and the tube of Fig. 12 having both internal and external protective annuli.

The invention can be applied generally to the manufacture of seamless composite tubes, pipes, conduits, etc., made up of a plurality of seamless substantially concentric annuli, one of the annuli being of such a metallic material and of such thickness to provide at least the major portion of the required strength for the intended service and the other annulus, or annuli, being of a metallic material, or materials, having some special property, or properties useful in the intended service which the first material has to an insufficient degree, or lacks entirely. When the seamless tube includes two annuli, the annulus having the special properties may be either the inner or the outer annulus. When the seamless tube includes three annuli, the annuli of special properties will form the inside and the outside of the tube. The inside and outside annuli may be of the same composition or when desired they may be of different composition. The metals of the composite tubes, pipes, conduits, etc., may be of any preferred metals that can be bonded together by fusion. Since the seamless composite tubes, pipes, conduits, etc., of the invention may well be used in widely different classes of service the metals of the component annuli used in any case will depend on the service.

Since plain carbon steel and carbon steel including alloying elements such as molybdenum, manganese, etc., in small proportions to impart to it special properties, is probably the cheapest and most used material for making tubes, pipes, conduits, etc., and also since chrominum-containing ferrous alloys, such as chromium-irons, chromium-steels, chromium-nickel, nickel-molybdenum, chrome-silicon steels, etc., are the most common of the metallic materials having superior corrosion resisting properties, the invention will be particularly described in connection with composite seamless tubes made up of steel and chromium-containing ferrous alloys.

To form a composite seamless tube that includes a seamless steel annulus internally covered with a thin seamless annulus of chrome-containing alloy bonded to the steel annulus throughout the interfacial area between the annuli, a steel ingot 20 is cast as in the usual manner. Ingot 20, after being heated to a suitable working temperature, is reduced to billet bar size as by passing it through a series of working rolls 21. The billet bar thus formed after being cropped and trimmed to remove all unsound metal is sheared or cut into billets 22. Billets 22 are then heated to a suitable working temperature and centered by forming small conical indentations 23 on the centers at each end. The centered billets 22 are then ready for piercing. The piercing operation may be carried out in any desired manner as by drilling, punching, trepanning etc. It may also be conveniently accomplished by passing the billets 22 through a Mannesmann mill as with this apparatus the billets are pierced or opened without loss of any metal. Mannesmann mills are standard equipment and are well known in the art. As diagrammatically shown in Figs. 4 and 5 they include a pair of angularly disposed rolls 24 which when a billet 22 is passed between them set up stresses in the billet 22 which cause the metal of the billet 22 to move outward away from its center thus forming a central opening or bore 25 therein and converting the solid billet into an annulus 26. The size of bore 25 should be such that its cross-section bears substantially the same relation to the cross-section of steel annulus 26 that the cross-section of the chromium-containing ferrous alloy portion of the finished tube bears to the cross section of the steel portion.

Steel annulus 26 is then formed into a composite billet 27 by filling central bore 25 with molten metal of the required composition to give a core 28 of chromium-containing ferrous alloy of desired composition that is continuously bonded to annulus 26. The molten metal employed for this purpose should be of such composition that when diluted with the metal which is melted off the sides of annulus 26 in order to form the required bond, the resulting metal will have the required composition. Bore 25 may be filled in various ways, thus the metal of core 28 may be cast into bore 25, as shown in Fig. 6, or it may be deposited therein under the influence of the electric arc as shown in Fig. 7. When the metal of core 28 is cast the molten metal 29 may be poured from a ladle 30 as shown, through suitable passageways 31, into the bottom of bore 25, or it may be poured through the top of bore 25. In the latter case the bottom of bore 25 is closed as by a plug of metal. In either case annulus 26 is preferably preheated to a sufficient degree to assure a proper bond between the molten metal and the sides of annulus 26. With either type of pouring it is preferred to maintain a blanket of flux 32 on the surface of the molten metal 29.

The flux is preferably a material that is substantially inert with regard to the molten metal and has the ability to absorb impurities out of the molten metal without adding any undesired constituent to the molten metal or absorbing any desired constituents from the molten metal. Fused silicates such as manganese silicate, iron silicate, calcium silicate, glass etc., and aluminates such as calcium aluminate, etc., are suitable flux materials. At present fused manganese silicate is the preferred flux material. Flux blanket 32 aside from removing impurities from the molten metal protects the molten metal from the atmosphere and because of its heat retaining capacity retards the cooling and solidification of the molten metal.

While bore 25 may be filled by pouring molten metal into it as just described, it is at present preferred to fill bore 25 with molten metal deposited under the influence of the electric arc. The arrangement diagrammatically shown in Fig. 7 may be used for this purpose. The apparatus diagrammatically shown in Fig. 7 includes an electrode feed wheel 33, an electrode contact device 34, a current generator 35, and cables 36 and 37 that connect generator 35 to contact device 34 and annulus 26 respectively. The electrode feed motor, arc, voltage and current control arrangements etc., that usually form part of welding machines have not been shown as it is not believed necessary for the purposes of this specification but it is to be understood that any of the usual elements necessary to render the apparatus shown operative are contemplated.

The metal necessary to fill central bore 25 is supplied by fusible electrode 38. Electrode 38 may be bare or covered and of such a composition that it will produce a core 28 of the desired composition. The constituents that electrode 38 supplies to core 28 may all be in the metallic portion of electrode 38, or some of them may be in the metallic portion and others of them in the covering. Also, electrode 38 may be a metal tube, as for instance a plain steel tube, and constituents desired in core 28 fed through it to the arc, or through the flux blanket 32 adjacent the arc, at the rate necesary to produce molten metal of the desired composition.

To form core 28 by electric arc deposition the annulus 26, after having its bottom end closed, as by welding a disc 39 thereto of composition similar to that of the desired core 28, is placed beneath the welding head with central bore 25 beneath electrode feeding wheel 33. Cable 37 is then connected to annulus 26 and electrode 38 fed towards disc 39 until it approaches the surface of disc 39. To facilitate the starting of the arc any of the well known arc starters may be interposed between the end of electrode 38 and the surface of disc 39. A blanket of flux 32 is then placed on the surface of disc 39. Flux blanket 32 while it may be of any depth should at least be deep enough to submerge the arc. The various control arrangements are then set to give an arc of desired characteristics and the arc is struck.

The arc thus struck fuses welding electrode 38 and some of the metal of disc 39 into a molten mass which as it accumulates at first covers disc 39 and finally fills bore 25. Flux blanket 32 absorbs some of the heat generated by the arc and is thereby, at least the lower portion thereof, melted and highly heated. The highly heated flux, aside from protecting the arc and the deposited metal from the atmosphere, also serves by virtue of its insulating properties to maintain the upper portion of the deposited molten metal at a high temperature so that in combination with the heat supplied by the arc it will flow readily over the cross-section of bore 25 and will easily weld to the metal forming the sides of annulus 26.

The central arrangement of electrode 38, shown in Fig. 7, is usually satisfactory and assures a proper distribution of the deposited metal as well as a proper bonding of the deposited metal to the walls of annulus 26 when bore 25 is of moderate diameter. When the diameter of bore 25 is such that proper distribution and bonding is not obtained, electrode 38 may be arranged between the center and the sides of bore 25 and the annulus 26 rotated. For this purpose annulus 26 may be mounted on a suitable turntable, not shown. When bore 25 is of large diameter a plurality of electrodes 38 may be employed. Such plurality of electrodes 38 may be spaced apart on a diameter of bore 25 or may be arranged in any preferred manner. When a plurality of electrodes 38 are employed they need not all be of the same composition, one or more of the electrodes may contribute some of the constituents of the core 28 and the remainder contribute other of the constituents. In such case however the feed of the electrodes must be so controlled that the various constituents are deposited at rates to give the required proportions of constituents in the deposited metal. The separate deposition of constituents does not result in a non-homogeneous deposited metal as might be supposed but results in a deposited metal of uniform and homogeneous character. This result is due to the effects of flux blanket 27 and the submerged arcs since flux blanket 27 maintains the metal below it highly fluid and the arcs agitate the metal. The plurality of electrodes 38 may be separately fed and controlled or they may be fed and controlled as a unit. By reason of flux blanket 27 extraordinarily high energy values at each of the arcs may be employed. The high energy arcs make it possible to deposit metal at extraordinarily high rates.

When the metal of core 28 is deposited by electric arc deposition, as above described, the grain structure of the metal of core 28 is generally finer than that which results when the metal of core 28 is cast. The grain structure may be further improved to the point where it is comparable to that of the ordinary weld metal by removing heat from annulus 26 during the deposition of molten metal 29. Preferably the heat is removed at a rate sufficient to maintain the penetration of molten metal 29 into the sides of annulus 26 constant, thus not only preventing the formation of a deep pool of molten metal 29 but also assuring the formation of a core 28 of substantially constant cross-section. The cooling may be accomplished by playing a stream of heat exchange medium, such as water, on the lower end of annulus 26 during the play of the arc, or by providing a jacket or casting around annulus 26 through which a heat exchange medium, such as water, is circulated. When the latter expedient is used it is preferred that the cooling medium be kept at a level below that of molten metal 29 to assure the necessary penetration into the walls of annulus 26.

The composite billets 27, whose cores 28 have been formed either by casting or by electric arc deposition, as above described, are then heated to a suitable temperature preparatory to forming them into tubes. If preferred they may also be subjected to any desired heat treatment. The heated composite billets 27 are then centered by forming small conical indentations 40 on their centers at each end. The centered billets are then pierced to form a central opening, or bore 41 therein. As before, the piercing operation may be carried out in any preferred manner. It is at present preferred to pierce composite billets 27 by passing them through a Mannesmann mill. If boring, drilling, etc., is resorted to it is obvious that since metal of core 28 is removed and lost, core 28 must be made originally of such size to include the metal required in the finished tube as well as the metal removed during the piercing operation.

The pierced or opened billets are then passed through one or more rolling mills that include a pair of rolls 42 which cooperate with mandrels 43, to reduce their thickness and diameter and elongate them into tubes. The rolled tubes are then subjected to a sinking operation by passing them through one or more rolling mills. The sinking mills are generally similar to the rolling mills but do not include mandrels. In the sinking operation the tubes are generally brought to the finished dimensions. When required, the tubes, after the sinking operation, may be subjected to a cold rolling or a cold drawing operation. If this is done the tubes are brought to final dimensions in the cold rolling operation and not in the sinking operation.

The centered composite billets 27 are fed to the mills at such a rate that all of the stands are substantially continuously performing their particular operations on the work material and a substantial continuous stream of finished tubes leave the sinking mills or the cold mills, as the case may be. This type of operation is economically sound since the economies effected by it more than compensate for any loss of material due to holdup of the mills as a result of galling or wear of rolls, guide shoes, mandrels and the like. The loss due to holdups is hardly any greater than when solid steel seamless tubes are fabricated. This follows from the fact that the outside surface of the work, being steel, does not cause any more wear and galling than when solid steel seamless tubes are fabricated, and the inner surface, although it is a greater cause of wear and galling, comes into contact with only one or two mandrels 43 which can be easily and quickly replaced. The loss due to discarded metal is also not very much more than when solid seamless steel tubes are fabricated as the greater proportion of the work material is steel.

The finished seamless tube as shown in Fig. 10 is made up of an outer seamless steel annulus 26, the metal of annulus 26, that includes the major portion of the cross-section of the tube, and an inner seamless chromium containing alloy annular core 28, the metal of core 28, that includes a minor portion of the cross-section of the tube, bonded together into a unitary structure throughout the interfacial area between the annuli.

Throughout this application the term "interfacial area" is used to denote the bonding zone between the various annuli. It should be understood that this term is used merely to facilitate the description and that by its use it is not intended to infer that there is in fact an interfacial area between the various annuli. The finished tubes are unitary structures throughout and their annuli are in nowise separated.

The procedure above described is illustrative of the invention and can be varied in many particulars. Thus, as is generally preferred, the composite billet may be made from a composite ingot. This simplifies the process as the core metal of a plurality of billets is deposited in one operation instead of several and the initial piercing is also a single operation instead of several. In accordance with this preferred variation ingot 20 is cast as before and is perforated in any desired manner to form an annular ingot. This annular ingot may then have its bore filled with chromium containing ferrous alloy to form a composite ingot which is then rolled into a composite billet bar. The composite billet bar after being trimmed and cropped is then sheared or cut into composite billets 27. This procedure may also be varied. Thus instead of casting a solid ingot 20 the ingot may be cast as an annulus.

The above method together with its variations may also be used to fabricate the tube shown in Fig. 11. The tube of Fig. 11 has the seamless chromium containing alloy annulus 28 on the outside of the tube instead of on the inside. In fabricating the externally covered tube the ingot 20 instead of being made of steel as heretofore is made of the chromium containing alloy, and the bore of the ingot, or the bore of the opened billets, is filled with steel so that the resulting composite ingot or composite billets, include an outer alloy annulus and an inner steel core. In the subsequent fabrication, since the alloy surface is on the outside a greater amount of wear or galling will take place so that it may in some cases become necessary to pass one billet at a time through the fabricating apparatus. However even in such cases the resulting tube will be cheaper than a solid alloy tube.

In fabricating the tube of Fig. 11 a still further variation is possible as the composite billet may be made by filling with molten steel a chromium containing ferrous alloy annulus formed by rolling a thick plate of chromium containing ferrous alloy into a tube and welding the longitudinal edges or formed from a solid chromium containing ferrous alloy seamless tube of proper dimensions.

The tube of Fig. 12 is made up of three substantially concentric seamless annuli 26, 28 and 28' that are bonded to each other throughout their interfacial areas into a unitary structure. Annuli 28 and 28' are of chromium containing ferrous alloy and may be of the same or of different composition. Thus for instance, annulus 28 may be of a composition of sufficient corrosion or oxidation resistance in one class of service, and annulus 28' may be of a composition of sufficient corrosion or oxidation resistance for another class of service. Hence, annulus 28 may be of a composition suitable for withstanding the action of oxidizing combustion gases and annulus 28' may be of a composition suitable for withstanding the action of corrosive liquids or gases. Annulus 26 is of steel and includes the major portion of the cross-section of the composite tube.

The tube of Fig. 12 may also be fabricated in accordance with the above disclosure but the composite billet from which the final tube is rolled must include two annuli and a core instead of one annulus and a core. To form the three-element billet, a two-element billet having the metal of annulus 28 on the outside and a core of the metal of annulus 26 is formed, as described above. This two-element billet is then opened, in any of the ways stated above, as required to accommodate the metal of annulus 28'. The central bore is then filled with the metal of annulus 28', also in any of the ways stated above, to complete the three-element billet. This same procedure may be employed to form a three-element ingot from which three-element billets may be formed. Also the three-element billet, or three-element ingots, may be formed by depositing the molten metal of the annulus 26 in the annular space between an annulus containing the metal of annulus 28 and a cylindrical body containing the metal of annulus 28'.

The composite ingots or the composite billets required for making the composite tubes of Figs. 10 and 11 may also be made by a procedure similar to that just described. Thus, an annulus, ingot or billet, of one metallic material is formed in any of the ways heretofore described and in this annulus is placed concentrically therewith and spaced therefrom a metallic body, a cylinder or an annulus, of another metallic material. The annulus and the body are then united into an integral structure by depositing molten metal in the annular space separating them in any of the ways heretofore described. If casting is resorted to the annulus and the body may be preheated, also as heretofore described. The molten metal used to unite the annulus to the body and to fill the annular space may be of such composition that the resulting solidified metal will have a composition the same as, or approximating, the composition of either the annulus or the body.

Particular embodiments of the invention and preferred modes of carrying out the invention in practice have been disclosed, the invention is however not limited to said embodiments and said modes but such modifications and variations are also contemplated as fall within the scope of the invention which are set forth in the appended claims.

I claim:

1. A method of manufacturing composite metal articles comprising the steps of forming a hollow mold that includes as a part thereof metal of one composition and depositing in said mold under the influence of a flux blanketed electric energy discharge, metal of a different composition in an amount sufficient to substantially fill said mold thereby uniting said metal of different composition into an integral structure.

2. A method of manufacturing composite metal articles comprising the steps of forming an annular mold of metal of one composition and depositing in said mold under the influence of a flux blanketed electric energy discharge metal of a different composition in an amount sufficient to substantially fill said mold thereby uniting the wall metal of the mold and said deposited metal into an integral structure.

3. A method of manufacturing composite tubular articles having substantially concentric annuli of different composition bonded into an integral structure comprising the steps of depositing metal between preformed concentric bodies of metal of different composition under the influence of a flux blanketed electric discharge and subjecting said composited metal to working operations to form the desired tubular article and to work refine the metal thereof.

4. A method of manufacturing tubular articles having concentric annuli of different composition bonded into an integral structure, comprising the steps of forming a hollow mold that includes as a part thereof metal of one composition, supplying fusing metal of a different composition under the influence of an electric current discharge and beneath a blanket of protective flux in an amount sufficient to substantially fill said mold thereby uniting the fused metal and the mold to form an integral structure, subjecting the composite bonded metals to working operations to form the desired tubular articles and to work refine the composited metal.

5. A method of manufacturing metal tubes having concentric annuli, comprising the steps of forming a metallic annular body, filling said body with molten metal of a different composition under the influence of a flux blanketed electric arc to form a unitary composite metal body having a central core, and an annulus around said core integrally bonded thereto, opening the center of said composite body to form a composite annulus and subjecting the composite annulus to working operations whereby the thickness of the walls is reduced to the desired extent.

6. A method of manufacturing a tube having concentric annuli of metals of different composition, comprising the steps of forming an ingot of one metal, mechanically working said ingot into a billet bar, dividing the billet bar into billets, axially opening said billets to form annular bodies, filling each of said annular bodies with molten metallic material of different composition than the annular bodies under the influence of a flux blanketed electric energy discharge to form composite bodies having the metals integrally bonded, axially opening said composite bodies to form thick wall tubes and rolling said thick wall tubes to reduce their thickness to the desired amount and to work refine the metallic material contained in the tubes.

7. A method of forming a composite body to be used in the manufacture of a tube, comprising the steps of forming an annular body of one metallic material, closing one end of the annular body, depositing metal of a different composition in said annular body by means of an electric energy discharge beneath a protective flux blanket in an amount sufficient to substantially fill said annular body.

8. A method of forming a composite body to be used in the manufacture of tubes having annuli of different metals, comprising the steps of forming an annular body of one metal, depositing fused metal of a different composition in said annular body under the influence of a flux blanketed electric discharge in an amount sufficient to substantially fill said annular body and, during the period when metal is being deposited, removing heat at a rate to maintain the penetration of the fused metal into the metal of the annular body substantially uniform throughout.

9. A method of forming a composite body to be used in the manufacture of tubes, comprising the steps of forming an annular metal body, positioning within said annular body a substantially cylindrical body of such diameter as to provide an annular space therebetween, uniting said annular and cylindrical bodies into an integral structure by depositing in the annular space molten metal under the influence of a flux blanketed electric discharge.

ROBERT K. HOPKINS.